US012725775B2

(12) United States Patent
Kholomeev

(10) Patent No.: US 12,725,775 B2
(45) Date of Patent: Sep. 1, 2026

(54) HIGH-VOLTAGE RF GENERATOR FOR ION OPTICS

(71) Applicant: Thermo Fisher Scientific (Bremen) GmbH, Bremen (DE)

(72) Inventor: Alexander Kholomeev, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 285 days.

(21) Appl. No.: 18/673,821

(22) Filed: May 24, 2024

(65) Prior Publication Data

US 2024/0395535 A1 Nov. 28, 2024

(30) Foreign Application Priority Data

May 26, 2023 (GB) ..................................... 2307970

(51) Int. Cl.
*H01J 49/42* (2006.01)
*H01J 49/02* (2006.01)
*H01J 49/06* (2006.01)

(52) U.S. Cl.
CPC ........ *H01J 49/4225* (2013.01); *H01J 49/022* (2013.01); *H01J 49/063* (2013.01)

(58) Field of Classification Search
CPC .......... H01J 49/02; H01J 49/022; H01J 49/06; H01J 49/062; H01J 49/063; H01J 49/4225
See application file for complete search history.

(56) References Cited

U.S. PATENT DOCUMENTS

| | | | | |
|---|---|---|---|---|
| 9,136,101 | B2 | 9/2015 | Grinfeld et al. | |
| 9,536,722 | B2 | 1/2017 | Grinfeld et al. | |
| 10,284,154 | B1 | 5/2019 | Schoessow | |
| 10,699,888 | B2 | 6/2020 | Giannakopulos et al. | |
| 2021/0013915 | A1 * | 1/2021 | Schoessow | H03H 7/46 |
| 2021/0305991 | A1 * | 9/2021 | Smith | G01J 3/4338 |

FOREIGN PATENT DOCUMENTS

| | | | | |
|---|---|---|---|---|
| GB | 2527614 | A * | 12/2015 | H01J 49/022 |
| GB | 2580089 | A | 7/2020 | |
| GB | 2613439 | A | 6/2023 | |
| JP | H07326321 | A | 12/1995 | |

(Continued)

OTHER PUBLICATIONS

Search Report for related GB Application No. 2307970.0, mailed Nov. 28, 2023, 4 pages.

*Primary Examiner* — David E Smith
(74) *Attorney, Agent, or Firm* — Klarquist Sparkman, LLP

(57) ABSTRACT

Analytical instruments comprise an RF generator, first and second transformers having respective primary and secondary windings, and first and second ion optical devices. The secondary winding of the first transformer and the first ion optical device form a primary LC circuit with a first resonant frequency corresponding to a first frequency generated by the RF generator. The secondary winding of the second transformer and the second ion optical device form a secondary LC circuit with a second resonant frequency. At least part of the secondary LC circuit has a variable inductance that varies based on an output of a phase difference detector such that the second resonant frequency varies in dependence on a magnitude of an output of the phase difference detector.

21 Claims, 5 Drawing Sheets

(56) References Cited

FOREIGN PATENT DOCUMENTS

| | | | | |
|---|---|---|---|---|
| JP | 2004152658 | A | 5/2004 | |
| JP | 2013161666 | A | 8/2013 | |
| JP | 2014123469 | A | 7/2014 | |
| WO | 98/08593 | A1 | 3/1998 | |
| WO | 9938193 | A1 | 7/1999 | |
| WO | WO-2021225411 | A1 * | 11/2021 | .......... H02M 7/5395 |

* cited by examiner

HIGH-VOLTAGE RF GENERATOR FOR ION OPTICS

CROSS REFERENCE TO RELATED APPLICATION

This application claims priority from application GB 2307970.0, filed May 26, 2023. The entire disclosure of application GB 2307970.0 is incorporated herein by reference.

FIELD OF THE INVENTION

The present invention relates analytical instruments such as mass spectrometers, and in particular to analytical instruments comprising ion optical devices such as multipole ion optical devices.

BACKGROUND

For the ion optics of an analytical instrument, it is sometimes necessary to have several RF-powered ion optical devices, such as multipoles, separated mechanically and electrically, but operating with the same RF frequency with a fixed (preferably zero) phase between them. In this case, the amplitude of the RF voltage applied to the different ion optical devices may be different and may be set independently.

To reduce the power consumption of supplying RF generators, such arrangements are commonly designed on the basis of the LC resonance principle, utilising the inductance of the RF transformer in the generator and parasitic capacitances of the ion optical devices fed from this generator.

For two different ion optical devices, the self-resonance frequencies can differ significantly, which means that they cannot be powered at the same frequency and with a given phase between them without adjusting the parameters of the resonant tank in one of the generators.

Existing technical solutions to this problem have been developed for small RF voltage amplitudes, but the required voltage for ion optics can be several kilovolts; and practically the only known way to adjust the resonant circuit is to use a variable HV capacitor with an air dielectric.

However, this solution has several disadvantages: (i) high-voltage capacitors have a significant mass and size; (ii) even after tuning into resonance with the master generator, the phase between two generators will change uncontrollably; (iii) to implement automatic frequency control using a phase-locked loop (PLL) circuit, bulky electromechanical devices, such as step motors, etc., are required.

It is believed that there remains scope for improvements to analytical instruments such as mass spectrometers.

SUMMARY

A first aspect provides an analytical instrument in accordance with claim 1.

The analytical instrument comprises:

an RF generator configured to generate an RF voltage having a first frequency;

a first transformer having a primary winding and a secondary winding, wherein the RF generator is coupled to the primary winding of the first transformer;

a first ion optical device, wherein the first ion optical device is coupled to the secondary winding of the first transformer;

a second transformer having a primary winding and a secondary winding;

an amplifier having an input and an output, wherein a first signal from the RF generator or from the first transformer is provided to the input of the amplifier (7), and wherein the output of the amplifier is coupled to the primary winding of the second transformer;

a second ion optical device, wherein the second ion optical device is coupled to the secondary winding of the second transformer; and a phase difference detector unit having a first input and a second input, wherein the phase difference detector unit is configured to output a DC current or voltage proportional to a phase difference between signals received at the first and second inputs, wherein the first signal is provided to the first input of the phase difference detector, and wherein a second signal from the second transformer is provided to the second input of the phase difference detector unit;

wherein the secondary winding of the first transformer and the first ion optical device form a primary LC circuit having a first resonant frequency, and wherein the first frequency of the RF voltage generated by the RF generator is configured to correspond to the first resonant frequency;

wherein the secondary winding of the second transformer and the second ion optical device form a secondary LC circuit having a second resonant frequency, wherein the analytical instrument is configured such that at least part of the secondary LC circuit has a variable inductance, and wherein the analytical instrument is configured such that the inductance of the at least part of the secondary LC circuit varies in dependence on the magnitude of the output DC current or voltage of the phase difference detector unit such that the second resonant frequency varies in dependence on the magnitude of the output DC current or voltage of the phase difference detector unit.

Thus, embodiments provide pure electrical control of the inductance in the secondary LC circuit, preferably by controlling the inductance of a coil.

The analytical instrument may be configured such that the first ion optical device receives a first operating RF voltage having the first frequency, and such that the second ion optical device receives a second operating RF voltage having the first frequency. The analytical instrument may be configured such that variation of the second resonant frequency in dependence on the magnitude of the output DC current or voltage of the phase difference detector unit produces a negative feedback loop such that any phase difference between the first operating RF voltage and the second operating RF voltage is reduced or removed.

The secondary winding of the first transformer may have a first inductance, the first ion optical device may have a first self-capacitance, and the first inductance and the first self-capacitance may together form the primary LC circuit having the first resonant frequency.

The secondary winding of the second transformer may have a variable inductance, and the instrument may be configured such that the inductance of the secondary winding of the second transformer varies in dependence on the magnitude of the output DC current or voltage of the phase difference detector unit.

The second transformer may comprise one or more transformers, and the instrument may be configured such that the inductance of the secondary winding of the second transformer comprising the one or more transformers varies in dependence on the magnitude of the output DC current or voltage of the phase difference detector unit.

The second ion optical device may have a second self-capacitance, and the variable inductance and the second self-capacitance may together form the secondary LC circuit having the second resonant frequency.

The analytical instrument may further comprise an inductor having a variable inductance, wherein the output DC current or voltage of the phase difference detector unit is provided to the inductor, wherein the inductor is configured such that its inductance varies in dependence on the magnitude of the output DC current or voltage of the phase difference detector unit, and wherein the inductor is coupled to the secondary winding of the second transformer. Thus, the secondary winding of the second transformer may have a second inductance, the second ion optical device may have a second self-capacitance, and the second inductance, the variable inductance, and the second self-capacitance may together form the secondary LC circuit having the second resonant frequency.

The inductor may be formed from a converter having a primary winding and a secondary winding, wherein the output DC current or voltage of the phase difference detector unit is provided to the primary winding of the converter, and wherein the secondary winding of the converter is coupled to the secondary winding of the second transformer.

The secondary winding of the converter may be connected in series with the secondary winding of the second transformer, or the secondary winding of the converter may be connected in parallel with the secondary winding of the second transformer.

The second transformer (e.g. one or more of its one or more transformers) or the inductor (i.e. the converter) may comprise a magnetic core, and the output DC current or voltage of the phase difference detector unit may be configured to cause the magnetic core to be magnetised (e.g. by providing the output DC current to the primary winding of the converter), such that the inductance of the secondary winding of the second transformer or the inductance of the inductor varies in dependence on the magnitude of the output DC current of the phase difference detector unit.

The analytical instrument may be configured such that the first ion optical device receives a first operating RF voltage having the first frequency, wherein the first signal corresponds to the first operating RF voltage. The first signal may be generated by a first feedback module coupled to the RF generator, to the primary winding of the first transformer, or to the secondary winding of the first transformer.

The first signal may be provided to the input of the amplifier via a phase shifter.

The analytical instrument may be configured such that the second ion optical device receives a second operating RF voltage having the first frequency, wherein the second signal corresponds to the second operating RF voltage. The second signal may be generated by a second feedback module coupled to the primary winding of the second transformer or to the secondary winding of the second transformer.

The phase difference detector unit may comprise a phase detector configured to output a voltage proportional to a phase difference between signals received at the first and second inputs, and a voltage to current converter configured to convert the output voltage to the output DC current.

The phase difference detector unit may be configured such that a range of magnitudes of the output DC current is controllable.

The second transformer may comprise a magnetic core or may be air cored.

The first ion optical device may be a first multipole and/or the second ion optical device may be a second multipole. The first ion optical device may be a first quadrupole ion trap and/or the second ion optical device may be a second quadrupole ion trap.

The first ion optical device may be configured such that the first operating RF voltage generates a first RF field that confines ions in a trapping region of the first ion optical device. The second ion optical device may be configured such that the second operating RF voltage generates a second RF field that confines ions in a trapping region of the second ion optical device. The instrument may be configured such that the first operating RF voltage and the second operating RF voltage have substantially identical frequency and aligned phase.

The first ion optical device may be arranged in a relatively low gas pressure region, and the second ion optical device may be arranged in a relatively high gas pressure region. The instrument may comprise a gas conductance restriction configured to restrict gas flow from the relatively high gas pressure region to the relatively low gas pressure region, the gas conductance restriction having an aperture to allow ions to pass from the second ion optical device to the first ion optical device (and/or vice versa).

The instrument may be configured such that: (i) ions may be accumulated and/or processed (e.g. cooled and/or fragmented) in the second ion optical device; (ii) accumulated and/or processed ions may be passed from the second ion optical device to the first ion optical device; and (iii) ions may be ejected from the first ion optical device. The first ion optical device and/or the second ion optical device may form part of a mass analyser, and the instrument may be configured such that ions may be ejected from the first ion optical device into the mass analyser for mass analysis. The mass analyser may be a time-of-flight (ToF) mass analyser such as a multi-reflection time-of-flight (MR-ToF) mass analyser, and the instrument may be configured such that ions may be ejected from the first ion optical device into a flight path of the time-of-flight (ToF) mass analyser.

The analytical instrument may be or may comprise a mass spectrometer.

DESCRIPTION OF THE DRAWINGS

Various embodiments will now be described in more detail with reference to the accompanying Figures, in which.

DETAILED DESCRIPTION

Figure 1:
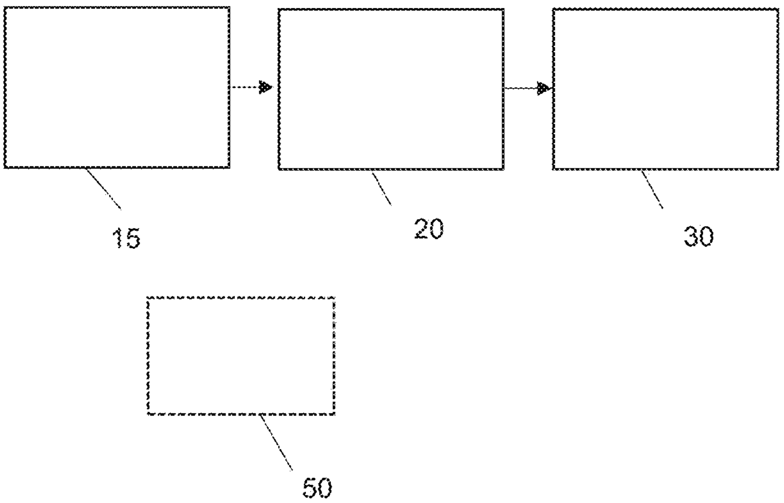
FIG. 1 shows schematically an analytical instrument in accordance with embodiments.

FIG. 1 illustrates schematically an analytical instrument, such as a mass spectrometer, that may be configured and operated in accordance with embodiments.

As shown in FIG. 1, the analytical instrument includes an ion source 15, one or more ion transfer stages 20, and a mass analyser 30.

The ion source 15 is configured to generate ions from a sample. The ion source 15 can be any suitable continuous or pulsed ion source, such as an electrospray ionisation (ESI) ion source, a MALDI ion source, an atmospheric pressure ionisation (API) ion source, a plasma ion source, an electron ionisation ion source, a chemical ionisation ion source, and so on. In some embodiments, more than one ion source may be provided and used. The ions may be any suitable type of ions to be analysed, e.g. small and large organic molecules, biomolecules, DNA, RNA, proteins, peptides, fragments thereof, and the like.

The ion source 15 may optionally be coupled to a separation device such as a liquid chromatography separation device, a gas chromatography separation device, or a capillary electrophoresis separation device (not shown), such that the sample which is ionised in the ion source 15 comes from the separation device.

The ion transfer stage(s) 20 are arranged downstream of the ion source 15 and may include an atmospheric pressure interface and one or more ion guides, lenses, traps and/or other ion optical devices configured such that some or all of the ions generated by the ion source 15 can be transferred from the ion source 15 to the analyser 30. The ion transfer stage(s) 20 may include any suitable number and configuration of ion optical devices, for example optionally including any one or more of: one or more RF and/or multipole ion guides, one or more ion guides for cooling ions, one or more mass selective ion guides, and so on.

The mass analyser 30 is arranged downstream of the ion transfer stage(s) 20 and is configured to receive ions from the ion transfer stage(s) 20. The mass analyser is configured to analyse the ions so as to determine their mass to charge ratio (m/z). The analyser 30 can be any suitable mass analyser, such as a time-of-flight (ToF) mass analyser, an ion trap mass analyser, a quadrupole mass analyser, and so on.

It should be noted that FIG. 1 is merely schematic, and that the analytical instrument can, and in embodiments does, include any number of one or more additional components. For example, in some embodiments, the analytical instrument includes a collision or reaction cell for fragmenting or reacting ions, and the ions analysed by the mass analyser 30 can be fragment or product ions produced by fragmenting or reacting parent ions generated by the ion source 15.

As also shown in FIG. 1, the instrument is under the control of a control unit 50, such as an appropriately programmed computer, which controls the operation of various components of the instrument including the ion transfer stage(s) 20 and the analyser 30. The control unit 50 may also receive and process data from various components including the analyser 30.

Figure 2:
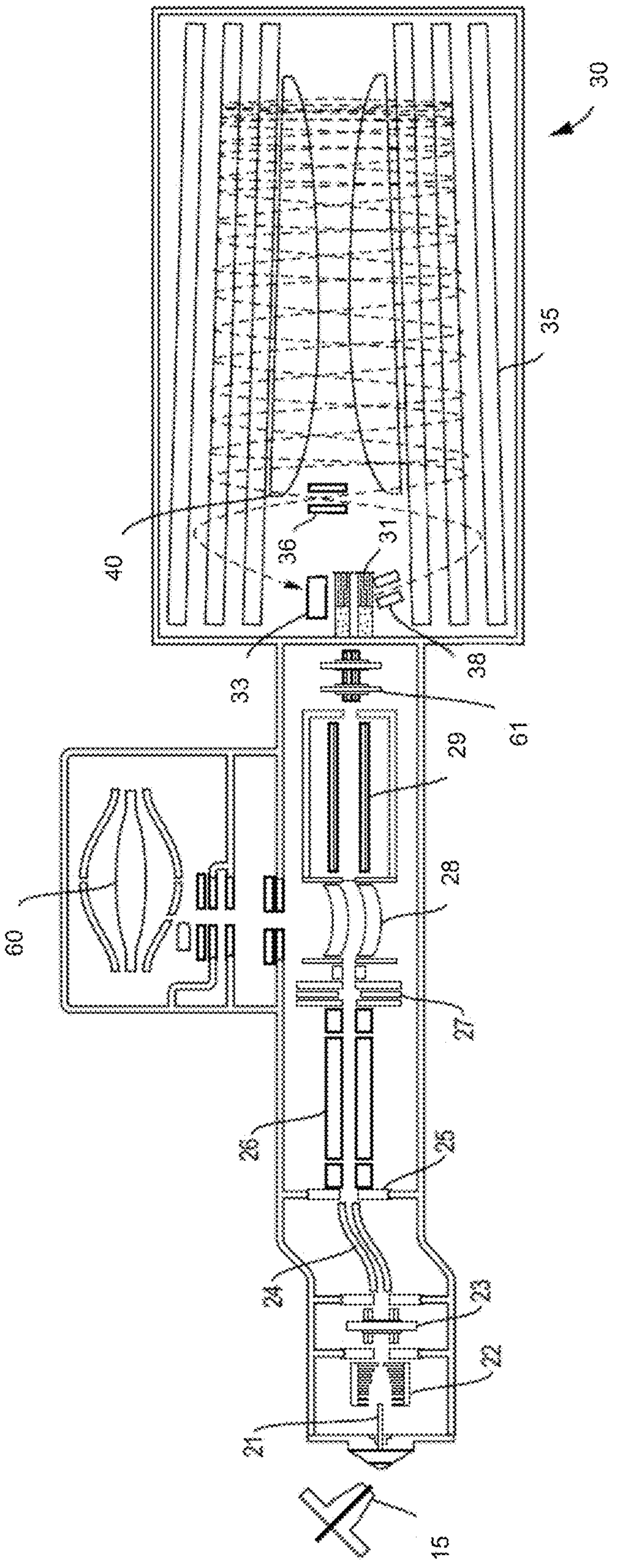
FIG. 2 shows schematically detail of an analytical instrument in accordance with embodiments.

FIG. 2 illustrates schematically detail of one exemplary mass spectrometer including an MR-ToF mass analyser that may be configured and operated in accordance with embodiments. It will be understood that the instrument shown in FIG. 2 is a non-limiting example, and that numerous variations are possible.

In the embodiment depicted in FIG. 2, the instrument's ion source 15 is an electrospray ionisation (ESI) ion source. The instrument includes a vacuum interface, which includes a transfer tube 21, an ion funnel 22, a quadrupole pre-filter ion guide 23, and a "bent flatapole" ion guide 24. The bent flatapole ion guide 24 may be of the design described in U.S. Pat. No. 9,536,722.

The instrument also includes a mass filter in the form of a quadrupole mass filter 26, an ion trap 28 in the form of a curved linear ion trap ("C-Trap"), and a collision cell 29 in the form of an ion routing multipole collision cell ("IRM"). Ions from the ion source 15 can be accumulated in the C-Trap 28 and/or collision cell 29 by opening and closing a gating electrode located in a charge detector assembly 27, which is arranged between the C-Trap 28 and the mass filter 26.

The instrument also includes a first mass analyser 60 in the form of an orbital ion trap mass analyser. Once accumulated in the ion trap 28 and/or collision cell 29, ions can be ejected into the mass analyser 60. To do this, the ions may be ejected from the trap 28 in a direction orthogonal to the axis of the trap (orthogonal ejection), for example by applying one or more suitable DC voltages to the ion trap 28.

The collision or reaction cell 29 is arranged downstream of the ion trap 28. Ions collected in the ion trap 28 can either be ejected orthogonally to the mass analyser 60 without entering the collision or reaction cell 29, or the ions can be transmitted axially to the collision or reaction cell 29 for processing before returning the processed ions to the ion trap 28 for subsequent orthogonal ejection to the mass analyser 60. The processing may comprise, for example, fragmenting the ions by collisions with a collision gas and/or a reagent in the collision cell 29, or further cooling the ions by collisions with a gas at lower energies that do cause the ions to fragment.

The instrument also includes a second mass analyser 30 in the form of a multi-reflection time-of-flight (ToF) mass analyser, which has been added to the rear of the instrument. This hybridized instrument is described in more detail in U.S. Pat. No. 10,699,888.

As shown in FIG. 2, the instrument includes a multipole ion guide 61 to allow ions to be transferred from the collision cell 29 to the time-of-flight mass analyser 30. Ions are delivered from the collision cell 29 to the extraction trap 31 of the mass analyser 30 via the multipole ion guide 61. The ions are accumulated and cooled in the extraction trap 31.

The extraction trap 31 may incorporate two trapping regions, one at a relatively higher pressure for rapid ion cooling, and a second low pressure region for ion extraction. Ions are cooled in the high-pressure region and then transferred to the low-pressure region, where they are pulse ejected into the ToF analyser via the pair of deflectors 36, 38. Ions oscillate between the pair of mirrors 34, 35, which are tilted relative to one another so that the ion path is slowly deflected and redirected back to the detector 33. Correcting stripe electrodes 40 counter the loss of ion focus otherwise induced by the non-parallelism of the mirrors.

Although the mass spectrometer depicted in FIG. 2 is particularly suitable, it will be understood that numerous alternative mass spectrometer configurations are possible. For example, the mass spectrometer depicted in FIG. 2 has two mass analysers 30, 60, but the mass spectrometer could have only a single mass analyser (or could have more than two mass analysers). In the instrument depicted in FIG. 2, the ToF mass analyser 30 is of a tilted-mirror type as described in U.S. Pat. No. 9,136,101, but it will be understood that any type of ToF analyser could be used. For example, the analyser may be a single-lens type multireflection time-of-flight mass analyser, e.g. as described in UK Patent No. GB 2580089, a linear ToF mass analyser, an orthogonal acceleration ToF mass analyser, a reflectron ToF mass analyser, a closed-loop multi-reflection mass analyser, another type of multi-reflection time-of-flight (MR-ToF) analyser, etc.

For the ion optics of a mass spectrometer, it is sometimes necessary to have several RF-powered ion optical devices, such as multipoles, separated mechanically and electrically, but operating with the same RF frequency with a fixed (preferably zero) phase between them. In this case, the amplitude of the RF voltage applied to the different ion optical devices may be different and may be set independently.

For example, in one embodiment, the extraction trap 31 of the instrument depicted in FIG. 2 may be of the design described in co-pending application GB2613439 (the contents of which is incorporated herein by reference) having a first multipole ion optical device and a second multipole ion optical device, and it may be desired to operate the first and second multipole ion optical devices with the same RF frequency with a fixed (preferably zero) phase between them. It will be understood that there are numerous other possible embodiments of analytical instruments having two or more ion optical devices for which it is desired to operate the ion optical devices with the same RF frequency with a fixed (preferably zero) phase between them.

It has been recognised that existing solutions to allow application of the same RF frequency with a fixed (preferably zero) phase difference to two or more ion optical devices are deficient for the reasons described above.

Figure 3:
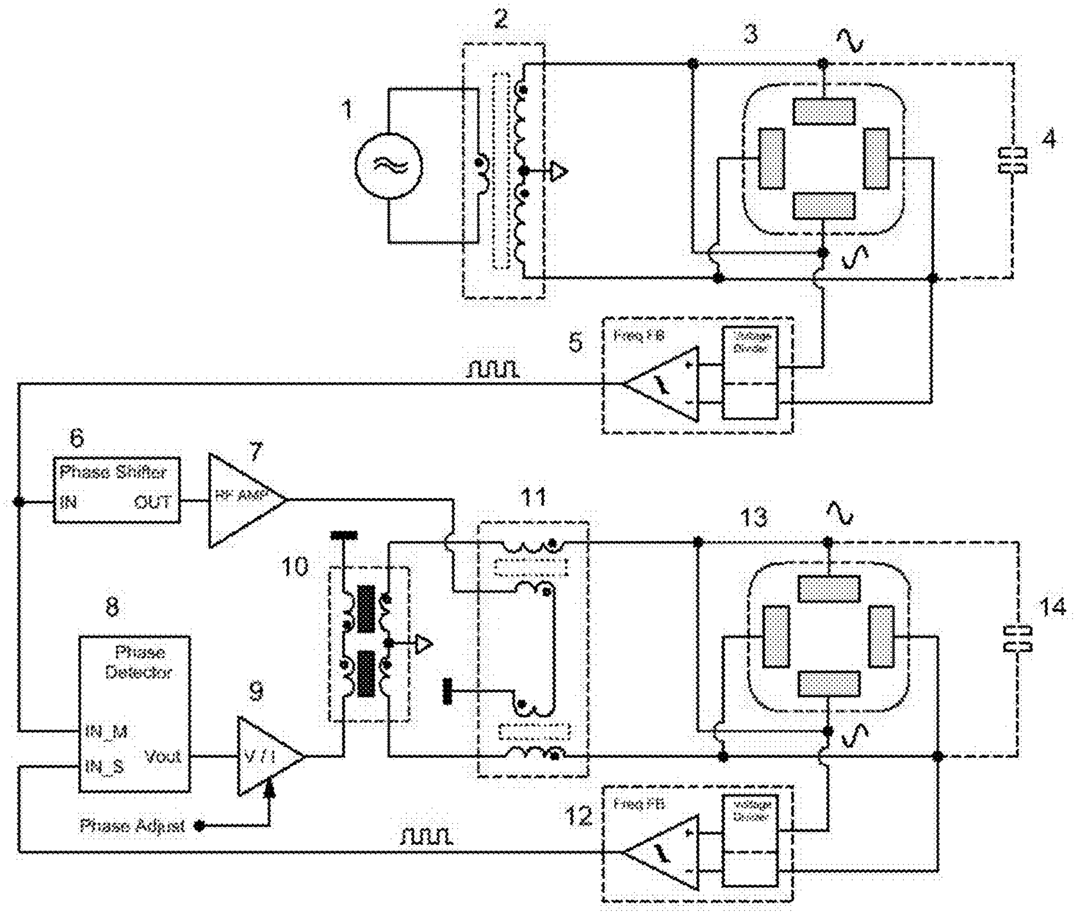
FIG. 3 shows schematically detail of a synchronized high voltage resonant RF generator for the ion optics of an analytical instrument in accordance with embodiments.

FIG. 3 shows a synchronized high voltage resonant RF generator for the ion optics of an analytical instrument in accordance with an embodiment.

As shown in FIG. 3, the ion optical system comprises at least two ion optical devices, i.e. a first ion optical device 3 and a second ion optical device 13, both of which are powered with RF voltage. In the embodiment depicted in FIG. 3, the ion optical devices 3, 13 are both quadrupoles, but in general the ion optical devices 3, 13 could be any suitable type or types of ion optical device. There may be more than two ion optical devices. In FIG. 3, the capacitors 4 and 14 are shown as being representative of the self-capacitance of the quadrupoles 3, 13.

As shown in FIG. 3, a master RF generator 1 is tuned to resonance with the resonant tank circuit (also known as an LC circuit) formed by the output inductance of a first transformer 2 and the capacitance 4. From the secondary winding of the first transformer 2, a signal is generated by a feedback module 5 corresponding to the working frequency for the first ion optical device 3, which is fed to a phase shifter 6 and to the reference input of a phase detector 8. It would instead be possible for the feedback module 5 to generate its signal from the master RF generator 1 or from the primary winding of the first transformer 2.

The phase shifter 6 is used for coarse compensation of phase differences between the RF voltages applied to the two quadrupoles 3 and 13. Although in FIG. 3 the phase shifter 6 is shown as not affecting the signal from the feedback module 5 as applied to the reference input of the phase detector 8, it would instead be possible to use the phase shifter 6 (or a second phase shifter) to apply coarse phase compensation to the signal fed to the reference input of the phase detector 8.

The control signal after the phase shifter 6 is amplified by an amplifier 7 and fed to the primary winding of a second transformer 11. The output voltage of the second transformer 11 is supplied to the second driven quadrupole 13.

In series with the secondary winding of the second transformer 11, the secondary winding of a current-controlled transformer 10 is connected. The sum of the inductances of these windings and the capacitance 14 determines the resonant frequency of this second resonant tank circuit (secondary LC circuit).

The device 10 is an adjustable inductor that does not have a usual primary winding. This inductor comprises two identical parts connected only by control windings. These windings are connected anti serial, so at the input of the entire winding (the output of the converter 9), the RF voltages are subtracted and their resulting value will be zero. Thus, the device 10 does not transform the input voltage.

From the secondary winding of the second transformer 11, a feedback module 12 generates a signal corresponding to the operating frequency of the voltage supplied to the second ion optical device 13, which is fed to the feedback input of the phase detector 8. It would instead be possible for the feedback module 12 to generate its signal from the primary winding of the second transformer 11.

A voltage proportional to the phase difference between the RF voltages applied to the quadrupoles from the output of the phase detector 8 is converted into a control bias current that magnetizes the core of the current-controlled transformer 10, thereby leading to changes in its inductance.

This in turn leads to a change in the resonance frequency of the secondary LC circuit. Due to negative feedback in the frequency and phase control loop, this has the effect of reducing the phase difference between the RF voltages, preferably to zero.

By applying a bias voltage to an optional converter 9, this phase shift can be changed in some range, if necessary.

Thus, it will be understood that, in embodiments, electrical control of the output inductance of an RF transformer in a slave generator (or generators) is provided by magnetizing its magnetic material core with direct current, which allows this generator (or generators) to be synchronized with the master generator.

Various alternatives to the arrangement depicted in FIG. 3 are possible. For example, although FIG. 3 depicts a master generator circuit (primary LC circuit) and a single slave generator circuit (secondary LC circuit), it would be possible to have multiple slave generator circuits, each driving a respective ion optical device.

Although FIG. 3 shows one possible configuration of an RF transformer with electrically adjustable output inductance, various other embodiments are possible.

For example, in FIG. 3, the secondary windings of the converter 10 and the second transformer 11 are connected in series, but it would also be possible for the secondary winding of the inductor 10 to be connected in parallel with part of the secondary winding of the second transformer 11, which also allows control of the total inductance of these devices 10, 11.

Figure 4:
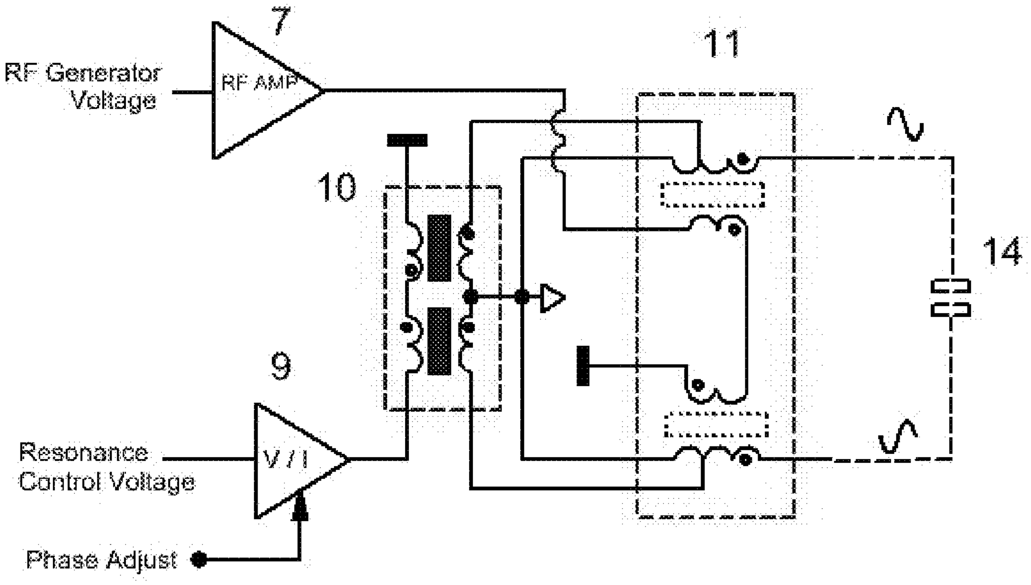
FIG. 4 shows schematically detail of a synchronized high voltage resonant RF generator for the ion optics of an analytical instrument in accordance with embodiments.

FIG. 4 shows one such embodiment, wherein the variable inductance is provided by parallel connection of a variable inductor 10 to a part of the secondary winding of the second RF transformer 11.

Figure 5:
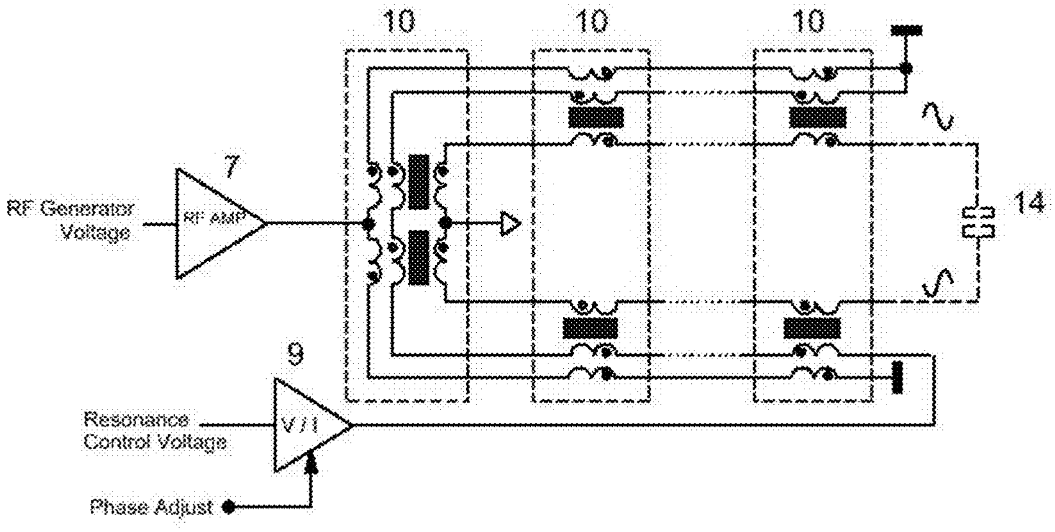
FIG. 5 shows schematically detail of a synchronized high voltage resonant RF generator for the ion optics of an analytical instrument in accordance with embodiments.

It would also be possible for the second LC circuit to comprise only a transformer 10 built from a greater, but even number of coils connected in series together with an additional primary winding for connection to the amplifier 7. FIG. 5 shows one such embodiment, wherein a controlled high-voltage RF inductor is constructed from several identical elements with a variable inductance containing a magnetic core, primary and secondary windings, as well as a control winding.

However, it will be understood when comparing FIGS. 3 and 5, that the transformer 11 depicted in FIG. 3 reduces the number of coils and simplifies driving from the RF generator relative to FIG. 5.

It will accordingly be understood that, in general, embodiments provide pure electrical control of the inductance in the second high-voltage resonant tank circuit (secondary LC circuit), preferably by controlling the inductance of a coil.

The arrangement depicted in FIG. 3 has been implemented in the development of the mass spectrometer depicted in FIG. 2, and has been fully validated. The phase difference between the RF voltages on the quadrupoles did not exceed 1 degree in the entire applicable range of amplitudes and ambient temperatures. The operating frequency of the generators were around 4 MHz, with output voltages up to 1800 Vpp.

Although the present invention has been described with reference to various embodiments, it will be understood that various changes may be made without departing from the scope of the invention as set out in the accompanying claims.

I claim:

1. An analytical instrument comprising:

an RF generator configured to generate an RF voltage having a first frequency;

a first transformer having a primary winding and a secondary winding, wherein the RF generator is coupled to the primary winding of the first transformer;

a first ion optical device, wherein the first ion optical device is coupled to the secondary winding of the first transformer;

a second transformer having a primary winding and a secondary winding;

an amplifier having an input and an output, wherein a first signal from the RF generator or from the first transformer is provided to the input of the amplifier, and wherein the output of the amplifier is coupled to the primary winding of the second transformer;

a second ion optical device, wherein the second ion optical device is coupled to the secondary winding of the second transformer; and a phase difference detector having a first input and a second input, wherein the phase difference detector unit is configured to output a DC current or voltage proportional to a phase difference between signals received at the first and second inputs, wherein the first signal is provided to the first input of the phase difference detector, and wherein a second signal from the second transformer is provided to the second input of the phase difference detector unit;

wherein the secondary winding of the first transformer and the first ion optical device form a primary LC circuit having a first resonant frequency, and wherein the first frequency of the RF voltage generated by the RF generator is configured to correspond to the first resonant frequency;

wherein the secondary winding of the second transformer and the second ion optical device form a secondary LC circuit having a second resonant frequency, wherein the analytical instrument is configured such that at least part of the secondary LC circuit has a variable inductance, and wherein the analytical instrument is configured such that the inductance of the at least part of the secondary LC circuit varies in dependence on a magnitude of an output DC current or voltage of the phase difference detector unit such that the second resonant frequency varies in dependence on the magnitude of the output DC current or voltage of the phase difference detector unit.

2. The analytical instrument of claim 1, wherein:

the analytical instrument is configured such that the first ion optical device receives a first operating RF voltage having the first frequency;

the analytical instrument is configured such that the second ion optical device receives a second operating RF voltage having the first frequency; and the variation of the second resonant frequency in dependence on the magnitude of the output DC current or voltage of the phase difference detector unit produces a negative feedback loop such that any phase difference between the first operating RF voltage and the second operating RF voltage is reduced or removed.

3. The analytical instrument of claim 1, wherein:

the secondary winding of the first transformer has a first inductance;

the first ion optical device has a first self-capacitance; and the first inductance and the first self-capacitance together form the primary LC circuit having the first resonant frequency.

4. The analytical instrument of claim 1, wherein:

the secondary winding of the second transformer has a variable inductance, and the analytical instrument is configured such that the inductance of the secondary winding of the second transformer varies in dependence on the magnitude of the output DC current or voltage of the phase difference detector unit.

5. The analytical instrument of claim 4, wherein:

the second transformer comprises one or more transformers, and the analytical instrument is configured such that the inductance of the secondary winding of the second transformer comprising one or more transformers varies in dependence on the magnitude of the output DC current or voltage of the phase difference detector unit.

6. The analytical instrument of claim 4, wherein:

the second ion optical device has a second self-capacitance; and the variable inductance and the second self-capacitance together form the secondary LC circuit having the second resonant frequency.

7. The analytical instrument of claim 1, further comprising:

an inductor having a variable inductance, wherein the output DC current or voltage of the phase difference detector unit is provided to the inductor, wherein the inductor is configured such that its inductance varies in dependence on the magnitude of the output DC current or voltage of the phase difference detector unit, and wherein the inductor is coupled to the secondary winding of the second transformer.

8. The analytical instrument of claim 7, wherein:

the secondary winding of the second transformer has a second inductance;

the second ion optical device has a second self-capacitance; and the second inductance, the variable inductance, and the second self-capacitance together form the secondary LC circuit having the second resonant frequency.

9. The analytical instrument of claim 7, wherein the inductor is formed from a converter having a primary winding and a secondary winding, wherein the output DC current or voltage of the phase difference detector unit is provided to the primary winding of the converter, and wherein the secondary winding of the converter is coupled to the secondary winding of the second transformer.

10. The analytical instrument of claim 9, wherein the secondary winding of the converter is connected in series with the secondary winding of the second transformer.

11. The analytical instrument of claim 9, wherein the secondary winding of the converter is connected in parallel with the secondary winding of the second transformer.

12. The analytical instrument of any one of claim 7, wherein the second transformer or the inductor comprises a magnetic core, and wherein the output DC current or voltage of the phase difference detector unit is configured to cause the magnetic core to be magnetised, such that the inductance of the secondary winding of the second transformer or the inductance of the inductor varies in dependence on the magnitude of the output DC current of the phase difference detector unit.

13. The analytical instrument of claim 1, wherein:

the analytical instrument is configured such that the first ion optical device receives a first operating RF voltage having the first frequency;

the first signal is generated by a first feedback module coupled to the RF generator, to the primary winding of the first transformer, or to the secondary winding of the first transformer; and the first signal corresponds to the first operating RF voltage.

14. The analytical instrument of claim 1, wherein the first signal is provided to the input of the amplifier via a phase shifter.

15. The analytical instrument of claim 1, wherein:

the analytical instrument is configured such that the second ion optical device receives a second operating RF voltage having the first frequency;

the second signal is generated by a second feedback module coupled to the primary winding of the second transformer or to the secondary winding of the second transformer; and the second signal corresponds to the second operating RF voltage.

16. The analytical instrument of claim 1, wherein the phase difference detector unit comprises a phase detector configured to output a voltage proportional to a phase difference between signals received at the first and second inputs, and a voltage to current converter configured to convert the output voltage to the output DC current.

17. The analytical instrument of claim 1, wherein the phase difference detector unit is configured such that a range of magnitudes of the output DC current is controllable.

18. The analytical instrument of claim 1, wherein the second transformer comprises a magnetic core or is air cored.

19. The analytical instrument of claim 1, wherein the first ion optical device is a first multipole and/or wherein the second ion optical device is a second multipole.

20. The analytical instrument of claim 1, wherein the first ion optical device is a first quadrupole ion trap and/or wherein the second ion optical device is a second quadrupole ion trap.

21. The analytical instrument of claim 1, wherein the analytical instrument is or comprises a mass spectrometer.

* * * * *